(12) United States Patent
Brown et al.

(10) Patent No.: US 11,821,410 B2
(45) Date of Patent: *Nov. 21, 2023

(54) SMA ACTUATOR ASSEMBLY

(71) Applicant: CAMBRIDGE MECHATRONICS LIMITED, Cambridge (GB)

(72) Inventors: Andrew Benjamin Simpson Brown, Cambridge (GB); Peter Van Wyk, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,077

(22) Filed: Aug. 10, 2022

(65) Prior Publication Data

US 2022/0397104 A1 Dec. 15, 2022

Related U.S. Application Data

(63) Continuation of application No. 17/295,371, filed as application No. PCT/GB2019/053567 on Dec. 16, 2019, now Pat. No. 11,448,199.

(30) Foreign Application Priority Data

Dec. 14, 2018 (GB) ...................................... 1820383

(51) Int. Cl.
    *F03G 7/06* (2006.01)
(52) U.S. Cl.
    CPC ................. *F03G 7/06143* (2021.08)
(58) Field of Classification Search
    CPC .......... G03B 17/02; G03B 13/36; F03G 7/065
    See application file for complete search history.

(56) References Cited

U.S. PATENT DOCUMENTS

| 6,917,276 | B1 | 7/2005 | Menard et al. |
| 10,648,459 | B2 * | 5/2020 | Bunting .................. G02B 7/08 |

(Continued)

FOREIGN PATENT DOCUMENTS

| JP | 2011156006 | 8/2011 |
| WO | WO 2016075606 | 5/2016 |
| WO | 2018060229 A1 | 4/2018 |

OTHER PUBLICATIONS

GB Search Report dated Jun. 7, 2019 of GB Application 1820383.6.
International Search Report and Written Opinion of PCT/GB2019/053567 dated Feb. 2, 2020.

*Primary Examiner* — Shafiq Mian
(74) *Attorney, Agent, or Firm* — Haley Guiliano LLP

(57) ABSTRACT

A shape memory alloy actuator assembly comprises a first part, including a surface, a second part which moves relative to the first part across the surface and a resilient biasing element that biases the second part into contact with the first part so as to generate frictional forces therebetween for retaining the second part on the surface. At least one shape memory alloy actuator wire is connected between the first part and the second part and arranged to, on contraction thereof, apply a force to the second part with a component parallel to the surface that drives movement of the second part relative to the first part across the surface. Thus, the second part is retained on the surface when no power is applied to the shape memory alloy wire, and movement is achieved when power is applied.

13 Claims, 7 Drawing Sheets

(56) References Cited

U.S. PATENT DOCUMENTS

| | | | |
|---|---|---|---|
| 11,048,098 B2* | 6/2021 | Howarth | G02B 27/646 |
| 11,156,212 B2* | 10/2021 | Lintulahti | F03G 7/06145 |
| 2009/0128064 A1* | 5/2009 | Yang | G02B 7/102 |
| | | | 359/823 |
| 2011/0249131 A1 | 10/2011 | Topliss et al. | |
| 2017/0219842 A1* | 8/2017 | Howarth | H04N 23/687 |
| 2018/0284475 A1* | 10/2018 | Howarth | G02B 27/646 |
| 2018/0299023 A1 | 10/2018 | Gao et al. | |
| 2019/0293057 A1 | 9/2019 | Macaraeg et al. | |
| 2019/0325596 A1 | 10/2019 | Richards | |
| 2020/0309102 A1* | 10/2020 | Henderson | F03G 7/06 |
| 2021/0156367 A1 | 5/2021 | Howarth et al. | |

\* cited by examiner

SMA ACTUATOR ASSEMBLY

CROSS-REFERENCE TO RELATED APPLICATIONS

This application is a continuation of U.S. patent application Ser. No. 17/295,371, filed May 19, 2021, which is a national stage application under 35 U.S.C. § 371 of International Application PCT/GB2019/053567, filed Dec. 16, 2019, which claims priority of GB Patent Application 1820383.6, filed Dec. 14, 2018. The disclosures of which are hereby incorporated by reference herein in their entireties.

The present application relates to actuator assemblies in which at least one shape memory alloy (SMA) actuator wire drives relative movement of first and second parts.

Typical SMA actuator assemblies require power to be applied to the SMA actuator wire to retain given positions within a range of movement. This is a problem in some applications where only occasional actuation is required.

According to the present techniques, there is provided a shape memory alloy actuator assembly comprising: a first part, including a surface; a second part arranged to move relative to the first part across the surface; a resilient biasing element arranged to bias the second part into contact with the surface so as to generate frictional forces therebetween for retaining the second part in position on the surface; and at least one shape memory alloy actuator wire connected between the first part and the second part to the second part and arranged to, on contraction thereof, apply a force to the second part with a component orthogonal to the surface that reduces said frictional forces and with a component parallel to the surface so as to drive movement of the second part relative to the first part across the surface.

In this actuator assembly, the resilient biasing element biases the second part into contact with the surface of the first part, thereby generating frictional forces therebetween. The frictional forces are sufficient to retain the second part in position on the surface when no drive signal is applied to the at least one SMA actuator wire is not powered. However, when a drive signal is applied to the at least one SMA actuator wire causing contraction thereof, the applies a force to the second part with a component orthogonal to the surface that reduces said frictional forces and with a component parallel to the surface that drives movement of the second part relative to the first part across the surface. By applying a force with a component orthogonal to the surface, the at least one SMA actuator wire reduces the reaction between the second element and the surface which reduces the frictional forces. This reduction of the frictional forces assists with the overcoming of the frictional forces by the component of force applied by the at least one SMA actuator wire parallel to the surface. Thus, the actuator assembly tends to retain its position when no power is applied, but is capable of movement when power is applied. This is advantageous in applications where it is desired to minimise power consumption while allowing the second part to be retained in a predetermined position.

Advantageously, the at least one SMA actuator wire may comprise at least two opposed SMA actuator wires arranged to, on contraction thereof, apply forces to the second part with respective components orthogonal to the surface that reduce said frictional forces and with respective components parallel to the surface in opposite directions. In such an opposed arrangement, the two opposed SMA actuator wires bias each other, allowing the SMA actuator wires to expand when they cool. However, this is not essential and a single SMA actuator wire may be provided in which case biasing of the SMA actuator wire may be provided by the resilient element that biases the second part into contact with the surface or by an additional biasing element.

The at least one SMA actuator wire may be arranged on contraction thereof to apply a force to the second part with a component orthogonal to the surface that lifts the second part out of contact with the surface. This has the effect of reducing the frictional forces to zero on application of a drive signal to the SMA actuator.

Optionally, the actuator assembly may further comprise a bearing arrangement arranged to guide movement of the second part relative to the first part along a movement axis across the surface. For example, the bearing arrangement may comprise a pair of rolling or sliding bearings. Use of a bearing arrangement has the advantage of increasing the control over movement direction of the second part.

Where a bearing arrangement is provided, the at least one SMA may be inclined relative to the movement axis, as viewed orthogonally to the surface, at an acute angle of greater than 0° so as to, on contraction thereof, apply a force to the second part with a component orthogonal to the surface that reduces said frictional forces and with a component parallel to the surface along the movement axis. Such inclination of the at least one SMA actuator wire advantageously increases the gearing between the travel of the second part and the strain of the SMA actuator wire.

In this case, at least two opposed shape memory alloy actuator wires may be arranged to, on contraction thereof, apply forces to the second part with respective components orthogonal to the surface that reduce said frictional forces and with respective components parallel to the surface and along the movement axis in opposite directions.

In this case, the two opposed shape memory alloy actuator wires may be arranged to, on contraction thereof, apply forces to the second part which apply a first couple to the second element around an axis normal to the surface, and the bearing arrangement may be arranged to apply a second couple to the second part around an axis normal to the surface in an opposite sense from the first couple. In this manner, the first couple applied by the SMA actuator wires may be used to reduce play which may otherwise be present in the bearing arrangement, thereby increasing the control over the movement direction of the second part.

As an alternative to providing a bearing arrangement, the second part may be arranged to move relative to the first part in two dimensions across the surface. In that case, there may be provided at least two SMA actuator wires arranged to, on selective contraction thereof, apply forces to the second part with respective components orthogonal to the surface that reduce said frictional forces and with components parallel to the surface in two dimensions. In that manner, the actuator assembly is capable of driving movement of the second part relative to the first part in two dimensions across the surface.

The SMA actuator assembly may be applied to any type of device that comprises a first part and a second part which is movable with respect to the first part. By way of non-limitative example, the actuator assembly may be, or may be provided in, any one of the following devices: a smartphone, a camera, a foldable smartphone, a foldable smartphone camera, a foldable consumer electronics device, an image capture device, a 3D sensing device or system, a servomotor, a consumer electronic device, a mobile computing device, a mobile electronic device, a laptop, a tablet computing device, an e-reader (also known as an e-book reader or e-book device), a computing accessory or computing peripheral device (e.g. mouse, keyboard, headphones, earphones, earbuds, etc.), a security system, a gaming system, a gaming accessory (e.g. controller, headset, a wearable controller, etc.), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, and an autonomous vehicle. It will be understood that this is a non-exhaustive list of example devices.

Actuator assemblies as described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

To allow better understanding, an embodiment of the present techniques will now be described by way of non-limitative example with reference to the accompanying drawings, in which.

Except where the context requires otherwise, the term "bearing" is used herein as follows. The term "bearing" is used herein to encompass the terms "sliding bearing", "plain bearing", "rolling bearing", "ball bearing", "roller bearing" and "flexure". The term "bearing" is used herein to generally mean any element or combination of elements that functions to constrain motion to only the desired motion and reduce friction between moving parts. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. In embodiments, the bearing may be provided on, or may comprise, non-linear bearing surfaces.

In some embodiments of the present techniques, more than one type of bearing element may be used in combination to provide the bearing functionality. Accordingly, the term "bearing" used herein includes any combination of, for example, plain bearings, ball bearings, roller bearings and flexures.

Figure 1:
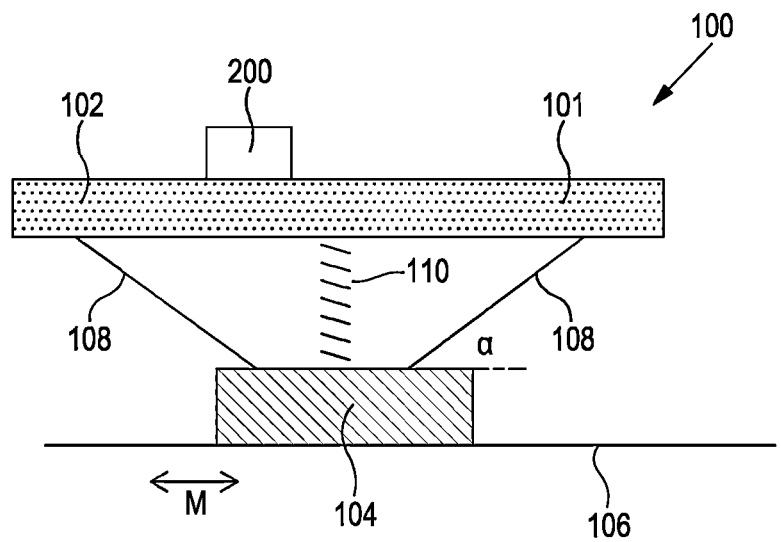
FIG. 1 is a side view of a first actuator assembly.
Figure 2:
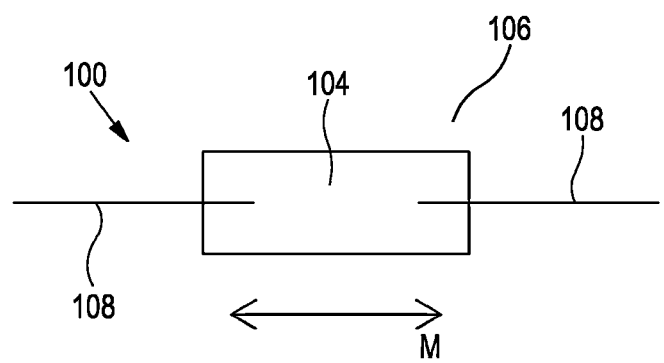
FIG. 2 is a plan view of the first actuator assembly.

FIGS. 1 and 2 illustrate a first actuator assembly 100 which is an actuator assembly that is arranged as follows.

The first actuator assembly 100 includes a static part 101 and a movable part 104 which are the first part and the second part, respectively, in this example. The movable part 104 is movable with respect to the static part 100 and the terms "static" and "movable" are used for clarity of description, but are somewhat arbitrarily applied to the two parts as the movement to which they refer is a relative movement between the static part 101 and the movable part 104.

The static part 101 includes a body 102 and a surface 106 held in a fixed position with respect to the body 106, for example by a connecting portion (not shown). A gap is provided between the body 101 and the surface 106.

The movable part 104 is located in the gap between the body 102 and the surface 106. The movable part 104 is capable of movement relative to the static part 101 across the surface 106. In this example, the movable part 104 is capable of movement across the surface 106 in any direction in two dimensions.

The movable part 104 may be any type of element, including any of the examples listed above.

The first actuator assembly 100 also includes a spring 110, which is a coil spring, connected between the static part 101 and the movable part 104 by being connected at one end to the body 101 and at the other end to the movable part 104. The spring 110 extends orthogonally to the surface 104 in this example, although that is not essential. The spring 110 is held in compression, and is therefore a resilient biasing element that acts as a biasing arrangement biasing the movable part 104 into contact with the surface 106. This generates a reaction between the movable part 104 and the surface 106, as well as generating frictional forces between the movable part 104 and the surface 106.

The first actuator assembly 100 also includes two SMA actuator wires 108 arranged as follows. Each SMA actuator wire 108 is connected at one end to the body 101 and at the other end to the movable part 104. Each SMA actuator wire 108 is inclined at an acute angle α of greater than 0° with respect to the surface 106 so as to apply a force, on contraction of the SMA actuator wire 108, with a component normal to the surface 106 that biases the movable part 104 away from the surface 106 and with a component parallel to the surface 106.

As shown in FIG. 2, which illustrates the first actuator assembly 100 with the body 101 omitted for clarity, the SMA actuator wires 108 are arranged in a common plane normal to the surface 106, each SMA actuator wire 108 being inclined in opposite senses so that they are opposed so that the components of force applied thereby parallel to the surface 106 are in opposite directions.

The SMA actuator wires 108 are each connected to a control circuit 200 which may be implemented in an integrated circuit chip. The control circuit 200 in use applies drive signals to the SMA actuator wires 108 which resistively heat the SMA actuator wires 108 causing them to contract. The plural SMA actuator wires 108 may be driven independently or otherwise. The control circuit may also measure the resistance of the SMA actuator wires 108, and use the measured resistance to calculate/determine the position of the movable part 104.

In the absence of drive signals being applied, the SMA actuator wires 108 do not contract, and so the spring 110 biases the movable part 104 onto the surface 106 generating frictional forces that are sufficient to retain the movable part 104 on the surface 106. In this state, the movable element 104 is retained in position with zero power consumption by the first actuator assembly 100, so the first actuator assembly 100 may be referred to as a zero power hold actuator assembly, as may the other actuator assemblies disclosed herein.

When drive signals are applied, the SMA actuator wires 108 are heated, causing them to contract and thereby applying force to the movable part 104.

In a direction orthogonal to the surface 106, the spring 110 acts as a resilient biasing element against contraction of the SMA actuator wires 108 that occurs in common. Thus, the component of force applied by the SMA actuator wires 108 to the movable part 104 orthogonal to the surface 106 that biases the movable part 104 away from the surface 106 reduces the reaction between the movable part 104 and the surface 106, thereby also reducing the frictional forces between the movable part 104 and the surface 106. Optionally, the SMA actuator wires 108 may lift the movable part 104 out of contact with the surface 106, thereby reducing the frictional forces between the movable part 104 and the surface 106 to zero.

In a direction parallel to the surface 106, the respective components of force applied by the SMA actuator wires 108 to the movable part 104 parallel to the surface 106 are in opposite directions. The net component of force applied to the movable part 104 parallel to the surface 106 drives movement of the movable part 104 relative to the static part 101 across the surface 106 when that net component of force is greater than the frictional forces. In use, the drive signals are selected to move the movable part 104 to a desired position relative to the static part 101 that is controlled by the power of the drive signals.

In use, the SMA actuator wires 108 are driven differentially by drive signals that generate differential contraction, as between the SMA actuator wires 108, to provide such net component of force that is overcomes the frictional forces. The drive signals are selected to move the movable part 104 to a desired and controlled position relative to the static part 101. In this example, there are no constraints on the movement of the movable part 104 across the surface 106 and so the movement axis M along which movement occurs is in the common plane in which the SMA actuator wires 108 are arranged.

When the drive signals cease to be applied, the frictional forces generated as a result of the biasing by the spring 110 again retain the movable part 104 on the surface 106, which may be a position that is different compared to that before application of the drive signals. In this state, the movable element 104 is once again retained in position with zero power consumption by the first actuator assembly 100.

Achievement of a net component of force that overcomes the frictional forces is assisted by the frictional forces also being reduced by the contraction of the SMA actuator wires 108 as described above. However, that is not essential. The SMA actuator wires 108 could alternatively apply a force the movable part 104 with no component normal to the surface 106. In that case, a greater force would be required to overcome the frictional forces, which is practical but less desirable.

While the example described above includes two SMA actuator wires 108 which are opposed, as an alternative a single SMA actuator wire 108 could be provided. In that case, the single SMA actuator wire 108 may be resiliently biased against the component of contraction of the SMA actuator wires 108 parallel to the surface 106 either by the spring 110 or by an additional resilient biasing element connected between the static part 101 and the movable part 104.

Further actuator assemblies will now be described. The further actuator assemblies are modified as compared to the first actuator assembly 101. The modifications will be described. Apart from the modifications the further actuator assemblies, and in particular the commonly named elements, have the same construction as described above, which is not repeated, for brevity. It is also noted that the different modifications of the further actuator assemblies may be combined in any combination.

Figure 3:
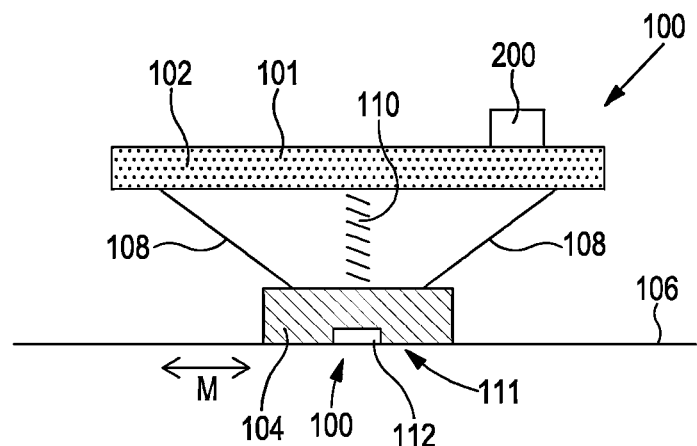
FIG. 3 is a side view of a first modified form of the first actuator assembly.
Figure 4:
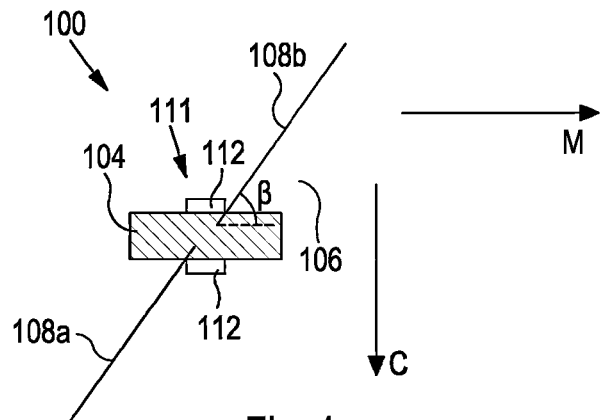
FIG. 4 is a plan view of the first modified form of the first actuator assembly.

FIGS. 3 and 4 illustrate a first modified form of the actuator assembly 100 which is an actuator assembly that is modified by the inclusion of a bearing arrangement 111 that guides movement of the movable part 104 relative to the static part 101 along a movement axis M across the surface 106. The bearing arrangement comprises a pair of bearings 112 arranged on opposite sides of the movable part 104. The bearings 112 are rolling bearings or sliding bearings.

Figure 5:
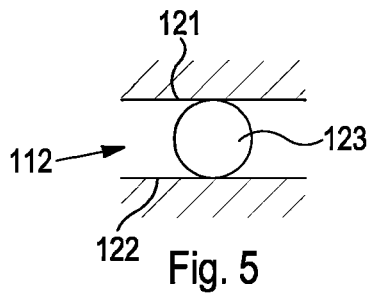
FIGS. 5 to 7 are detailed plan views of three different bearings that may be used in the first modified form of the actuator assembly.

FIG. 5 illustrates an example in which the bearing 112 is a rolling bearing. In this case, the bearing 112 comprises a pair of bearing surfaces 121 and 122, provided on the static part 101 and the movable part 104, respectively, and a rolling bearing element 123 disposed therebetween. The rolling bearing element 123 rolls on the bearing surfaces 121 and 122 so as to permit relative movement of the movable part 104 with respect to the static part 104 across the surface 106 along the movement axis M, while constraining such relative movement along a constraint axis C orthogonal to the movement axis M. The rolling bearing element 123 may be formed by any suitable element, for example a ball or roller.

Figure 6:
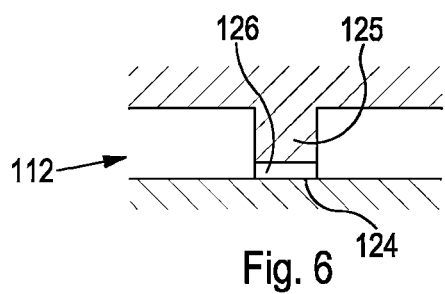

FIG. 6 illustrates an example in which the bearing 112 is a sliding bearing. In this case, the bearing 112 is a plain bearing that comprises an elongate bearing surface 124 provided on either one of static part 101 and the movable part 104 and a protrusion 125 formed on the other of the static part 101 and the movable part 104. The protrusion 125 has a bearing surface 126 on its end, which bears on the elongate bearing surface 124. Although one protrusion 125 is shown in the example of FIG. 6, in general any number of one or more protrusions 125 may be provided. The elongate bearing surface 124 and the bearing surface 126 are conformal, so as to permit relative movement of the movable part 104 with respect to the static part 101 across the surface 106 along the movement axis M, while constraining such relative movement along constraint axis C orthogonal to the movement axis M. The elongate bearing surface 125 and the bearing surface 127 desirably have a coefficient of friction of 0.2 or less.

Figure 7:
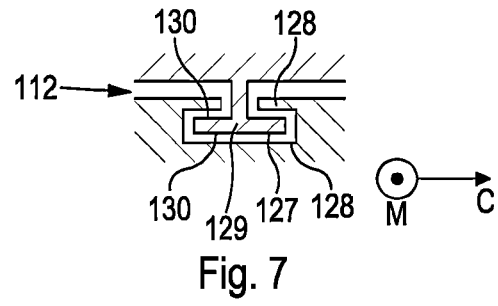

FIG. 7 illustrates another illustrates an example in which the bearing 112 is a sliding bearing. In this case, the bearing 112 comprises an elongate slot 127 provided on either one of static part 101 and the movable part 104, the slot 128 having opposed, internal bearing surfaces 128 formed on its internal surfaces. The bearing 112 further comprises a flange 129 provided on the other of the static part 101 and the movable part 104. The flange 129 fits within the slot 127 and has opposed, external bearing surfaces 130 which bear on the internal bearing surfaces 128 of the slot 127. The internal bearing surfaces 128 of the slot 128 and the external bearing surfaces 130 of the flange 129 are conformal, so as to permit relative movement of the movable part 104 with respect to the static part 101 across the surface 106 along the movement axis M, while constraining such relative movement along constraint axis C orthogonal to the movement axis M. The elongate bearing surface 125 and the bearing surface 127 desirably have a coefficient of friction of 0.2 or less.

The example of the bearing shown in FIG. 7 may restrict additional degrees of freedom of the motion of the movable part 104 with respect to the static part 101, compared to the other examples, In each of the examples of the bearing 112 shown in FIGS. 5 to 7, the materials of the various bearing surfaces 121, 122, 125 and 127 are chosen to provide smooth movement and a long life. The bearing surfaces 121, 122, 125 and 127 may be unitary with the underlying component or may be formed by a surface coating. Suitable materials include, for example PTFE or other polymeric bearing materials, or metal. A lubricant may be provided on the bearing surfaces 121, 122, 125 and 127. Such a lubricant may be a powder or a fluid, for example. A suitable lubricant is a low viscosity oil.

As shown in FIG. 4, the common plane normal to the surface 106 in which the SMA actuator wires 108 are arranged is at an acute angle β of greater than 0° relative to the direction of motion. Thus, the SMA actuator wires 108 are inclined relative to the movement axis M, as viewed orthogonally to the surface 106, at an acute angle β of greater than 0°. As a result, the SMA actuator wires 108, on contraction, each apply a force to the movable part 104 with a component along the movement axis M and a component along the constraint axis C. As in the first actuator assembly 100, the components of force applied to the movable part 104 parallel to the surface 106 and along the movement axis M by each SMA actuator wire 108 are in opposite directions. Thus, the first modified form of the actuator assembly 100 operates in the same manner as the actuator assembly 100 shown in FIGS. 1 and 2, except that the inclination of the SMA actuator wires 108 increases the gearing between the travel of the movable part 104 and the strain of the SMA actuator wires 108 which is advantageous.

As the first modified form of the actuator assembly 100 employs two bearings 112, the tolerances of such a bearing assembly 111 means that there might be play between the bearings 112 and the movable part 104. This means that the movable part 104 might have some residual motion along the constraint axis C as well as in the movement axis M. Some ways of reducing this problem by arranging the SMA actuator wires 108 to load the bearings 112 are as follows.

A first way to reduce the play between the bearings 112 and the movable part 104 is to modify the actuator assembly so that the SMA actuator wires 108 and the bearings 112 apply couples in opposite senses to the movable part 104.

Figure 8:
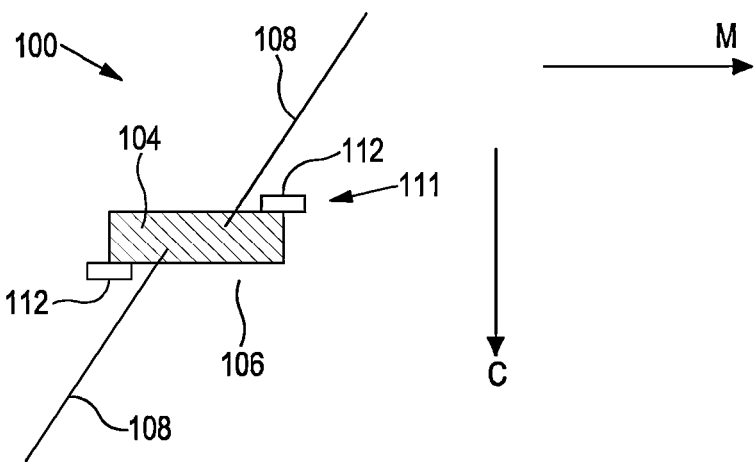
FIGS. 8 to 12 are plan views of second to sixth modified form of the first actuator assembly.

FIG. 8 illustrates a second modified form of the actuator assembly 100 which is an actuator assembly that is modified compared to the first modified form of the actuator assembly 100 shown in FIGS. 3 and 4 to implement this first way of reducing play between the bearings 112 and the movable part 104, as follows.

In the second modified form of the actuator assembly 100 shown in FIG. 8, the two SMA actuator wires 108 are connected to the movable part 104 at shifted positions so that the two SMA actuator wires 108 are no longer in a common plane, although they each remain within parallel planes that are normal to the surface 106. As a result, the SMA actuator wires 108, on contraction, apply forces to the movable part 104 which apply a first couple to the movable element around an axis normal to the surface 106, being anti-clockwise in the example of FIG. 8.

In addition, the bearings 112 are shifted in opposite directions along the movement axis, so that they apply a second couple to the movable part 104 around an axis normal to the surface 106, but in an opposite sense from the first couple, being clockwise in the example of FIG. 8. The second couple balances the first couple. Thus, the first couple generated by the two SMA actuator wires 108 biases the movable part 104 against each of the bearings 112 thereby loading the bearings 112 and reducing play.

In the second modified form of the actuator assembly 100 shown in FIG. 8, the SMA actuator wires are connected to the movable part 104 at positions along the movement axis M inside the bearings 112. Thus, while the couple applied by the two SMA actuator wires 108 when driven together is balanced by the bearings 112, a single one of the SMA actuator wires 108 should not be driven alone or else it will apply a couple around the adjacent bearing 112 that tends to bias the movable part 104 off the other bearing 112. There will now be described third and fourth modified forms of the actuator assembly 100 which prevent this while reducing play in a similar manner to the second modified form of the actuator assembly 100

Figure 9:
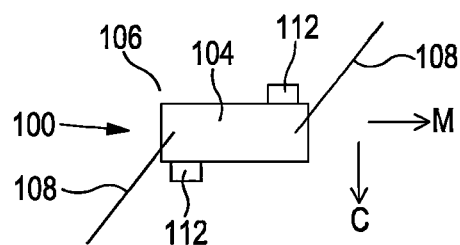

FIG. 9 illustrates a third modified form of the actuator assembly 100 which is similar to the second modified form shown in FIG. 8, except that the SMA actuator wires 108 are connected to the movable part 104 at positions along the movement axis M where the line of the force applied by each SMA actuator wire 108 to the movable part 104 is outside the bearings 112. Thus, the torque applied by each SMA actuator wire 108 about the adjacent bearing 112 is resisted by the other bearing 112. This provides balancing couples from the SMA actuator wires 108 and the bearings 112 causing the SMA actuator wires 108 to load the bearings 112 in a similar manner to the second modified form of the actuator assembly 100, while also allowing each SMA actuator wire 108 to be driven in isolation.

Figure 10:
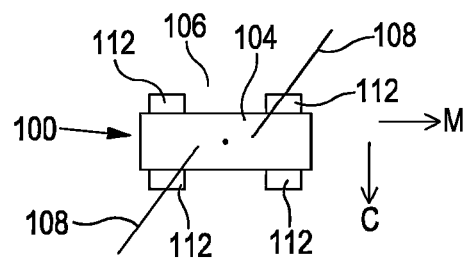

FIG. 10 illustrates a fourth modified form of the actuator assembly 100 which is similar to the second modified form shown in FIG. 8, except that two bearings 112 are provided on each side of the movable part 104 (although the two bearings 112 could be replaced by one long bearing). Thus, the line of the force applied by each SMA actuator wire 108 to the movable part 104 is between the extremities of the bearings 112 onto which that force is applied, so the SMA actuator wires 108 load the bearings 112 which resist rotation of the movable part 104.

A second way to reduce play between the bearings 112 and the movable part 104 is modify the bearing arrangement 111 to be formed by one or more bearings 112 on the same side of the movable part 104 and angle the SMA actuator wires 108 so that they provide a component of force that biases the movable part 104 against the one or more bearings 112, as well as providing the components of force discussed above.

Figure 11:
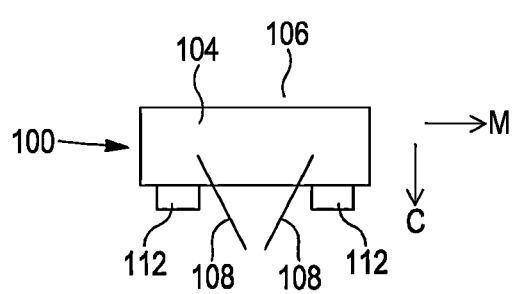

FIG. 11 illustrates a fifth modified form of the actuator assembly 100 which is an actuator assembly that is modified compared to the first modified form of the actuator assembly 100 shown in FIGS. 3 and 4 to implement this second way of reducing play between the bearings 112 and the movable part 104, as follows.

In this case, two bearings 112 are provided on the same side of the movable part 104 (although the two bearings 112 could be replaced by one long bearing).

In addition, each SMA actuator wire 108 is inclined relative to the movement axis M, as viewed orthogonally to the surface 106, at an acute angle β of greater than 0° on the same side of the movable part 104 as the bearings 112. As a result, the components of force applied by each by each SMA actuator wire 108, on contraction, along the constraint axis load the bearings 112.

A third way to reduce play between the bearings 112 and the movable part 104 is to modify the bearing arrangement 111 to be formed by a single bearing 112 and angle the spring 110 so that it is not coplanar with the SMA actuator wires 108, so that it biases the movable part 104 against the single bearing 112, as well as providing the force normal to the surface 106.

Figure 12:
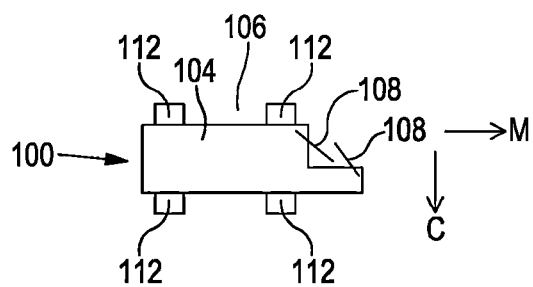

FIG. 12 illustrates a sixth modified form of the actuator assembly 100 which is an actuator assembly that is modified compared to the actuator assembly 100 shown in FIGS. 1 and 2 as follows. In the sixth modified form of the actuator assembly 100 shown in FIG. 12, the two SMA actuator wires 112 are disposed at one end of the movable part 104. As in the actuator assembly 100 shown in FIGS. 1 and 2, the SMA actuator wires 108 are inclined relative to the movement axis M, as viewed orthogonally to the surface 106, at an acute angle β of greater than 0°, so that the SMA actuator wires 108, on contraction, each apply a force to the movable part 104 with a component along the movement axis M and a component along the constraint axis C, but with the components of force applied to the movable part 104 parallel to the surface 106 and along the movement axis by each SMA actuator wire 108 are in opposite directions. To achieve this while providing the SMA actuator wires 108 at the same end, the movable part 104 includes an extension 107 to which one of the SMA actuator wires 108 is connected.

Figure 13:
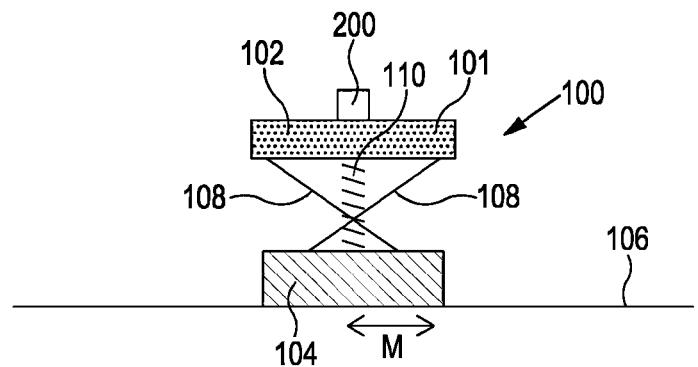
FIG. 13 is a side view of a seventh modified form of the first actuator assembly.

FIG. 13 illustrates a seventh modified form of the actuator assembly 100 which is an actuator assembly that is modified compared to the actuator assembly 100 shown in FIGS. 1 and 2 as follows. In the seventh modified form of the actuator assembly 100 shown in FIG. 13, the two opposed SMA actuator wires 108 are crossed as viewed parallel to the surface 106. In this manner, space is conserved and the overall size of the seventh modified form of the actuator assembly 400 is reduced. The SMA actuator wires 108

Whereas the above examples include two opposed SMA actuator wires 108, alternatively, the number of SMA actuator wires 108 may be increased to increase the force applied thereby. In general, any number of SMA wires 108 may be used.

Figure 14:
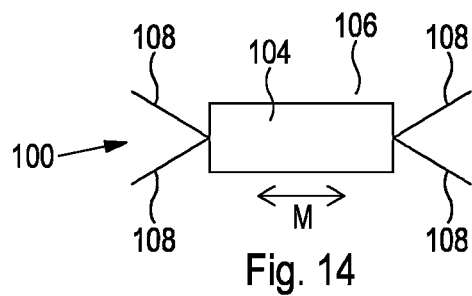
FIGS. 14 to 16 are plan views of eighth to tenth modified forms of the first actuator assembly.
Figure 15:
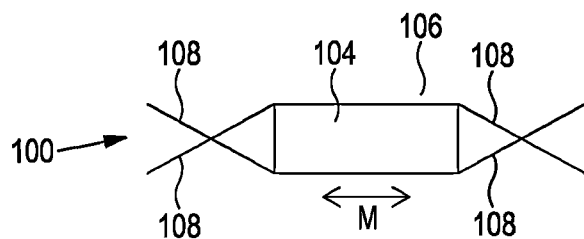
Figure 16:
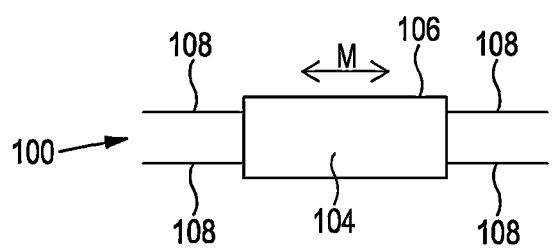
Figure 17:
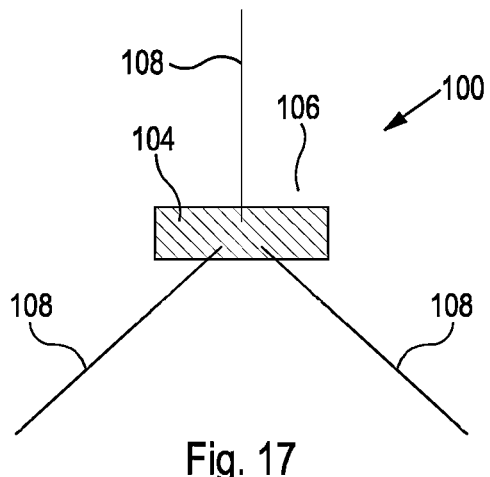
FIGS. 17 to 20 are plan views of an eleventh to fourteenth modified forms of the first actuator assembly.

For example, FIGS. 14 to 16 show eighth to tenth modified forms of the actuator assembly 101 which are each modified compared to FIG. 2, by replacing each SMA actuator wire 108 by a pair of SMA actuator wires 108.

In the eighth modified form of FIG. 14, the SMA actuator wires 108 of each pair are attached to the same point on the movable part 104 and are each inclined with respect to the movement axis M.

In the ninth modified form of FIG. 15, the SMA actuator wires 108 of each pair are attached to adjacent corners of the movable part 104, and are each inclined with respect to the movement axis M so that they cross one another as viewed from above.

In the tenth modified form of FIG. 16, the SMA actuator wires 108 of each pair extend parallel to each other and to the movement axis M.

In the examples of FIGS. 14 to 16, each pair of SMA actuator wires 108 may be driven in common by common drive signals, and the two pairs of SMA actuator wires 108 may be driven differentially by drive signals that generate differential contraction, as between the pairs of SMA actuator wires 108, to provide the same function as the examples described above.

FIGS. 17 to 20 illustrate an eleventh to fourteenth modified forms of the actuator assembly 100 which are modified compared to the actuator assembly 100 shown in FIG. 1 as follows.

In each of the eleventh to fourteenth modified forms of the actuator assembly 100, no bearing assembly is provided so the movable part 104 is free to move relative to the static part 101 in two dimensions across the surface 106. However, in contrast to the first actuator assembly 100 where the SMA actuator wires 108 are arranged in a common plane and so drive movement along a single movement axis, the SMA actuator wires 108 are modified to apply components of force parallel to the surface 106 in two dimensions, so as to be capable of driving movement of the movable part relative to the static part 101 in two dimensions across the surface, on application of drive signals which selectively contract the SMA actuator wires 108. FIGS. 13 and 14 illustrate two examples of configurations of SMA actuator wires 108 which achieve this, but in general the SMA actuator wires 108 may have any configuration that is capable of applying components of force parallel to the surface 106 in two dimensions In the eleventh modified form of the actuator assembly 100 shown in FIG. 17, three SMA actuator wires 108 are provided which are equally angularly spaced around the normal to the surface 106. As a result, the three SMA actuator wires 108 are opposed in two dimensions, and are driven by drive signals that generate differential contraction in two orthogonal directions. Thus, the three SMA actuator wires 108 are capable of applying a net component of force parallel to the surface to the movable part 104 in any direction in two dimensions across the surface 106, on selective contraction.

Figure 18:
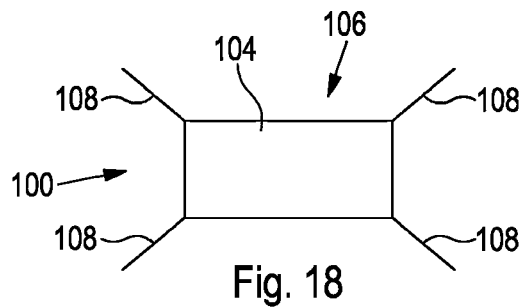
Figure 19:
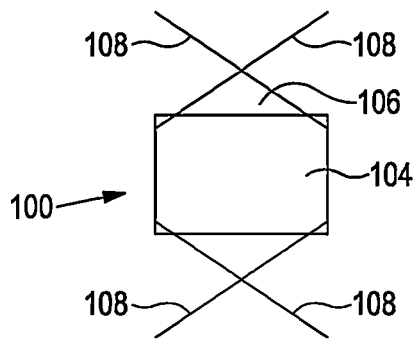

In the twelfth and thirteenth modified forms of the actuator assembly 100 shown in FIGS. 18 and 19, four SMA actuator wires 108 are provided so that two of the SMA actuator wires 108 are opposed in a first dimension and the other two of the SMA actuator wires 108 are opposed in a second dimension. The SMA actuator wires 108 that are opposed in each dimension are differentially driven by drive signals that generate differential contraction in the two orthogonal directions. Thus, the four SMA actuator wires 108 are capable of applying a net component of force parallel to the surface to the movable part 104 in any direction in two dimensions across the surface 106, on selective contraction.

Figure 20:
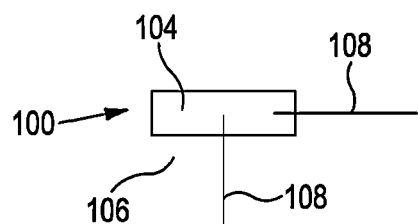

In the fourteenth modified form of the actuator assembly 100 shown in FIG. 20, two SMA actuator wires 108 are provided which are orthogonal to each other as viewed normal to the surface 106. As a result, the two SMA actuator wire 108 on contraction, apply components of force parallel to the surface 106 in orthogonal directions, thus applying a net component of force parallel to the surface to the movable part 104 in any direction in two dimensions across the surface 106 on selective contraction. As the components of force parallel to the surface 106 are orthogonal, the SMA actuator wires 108 are not opposed, because are each SMA actuator wire 108 drives movement in an orthogonal direction. In respect of the contract causing that movement, each SMA actuator wire 108 is resiliently biased by the spring 110. Optionally, each SMA actuator wire 108 could be resiliently biased by an additional resilient biasing element (not shown) connected between the static part 101 and the movable part 104. While the example described above includes two SMA actuator wires 108 which are opposed, as an alternative a single SMA actuator wire 108 could be provided. In that case, the single SMA actuator wire 108 may be resiliently biased against the component of contraction of the SMA actuator wires 108 parallel to the surface 106 either by the spring 110 or by an additional resilient biasing element connected between the static part 101 and the movable part 104.

In each of the eleventh to fourteenth modified forms of the actuator assembly 100, in use, the drive signals are selected to move the movable part 104 to a desired position relative to the static part 101 that is controlled in two dimensions by the power of the drive signals.

There will now be described some modifications to the biasing arrangement formed by the spring 110 in the above examples. Any of the following modifications may be applied to any of the forms of the actuator assembly 100 described above.

In general, the spring 110 may be replaced by any other type of biasing arrangement, including at least one resilient element, including: springs of any type, including a coil spring or a leaf spring; types of resilient element other than a spring; and any number of springs 110 or other type of resilient element. Examples of types of resilient biasing element that may be used instead of the spring 110 include a flexure, a block of resilient material or a spring arranged in tension between the movable part 104 and the surface 106. Some examples are as follows.

Figure 21:
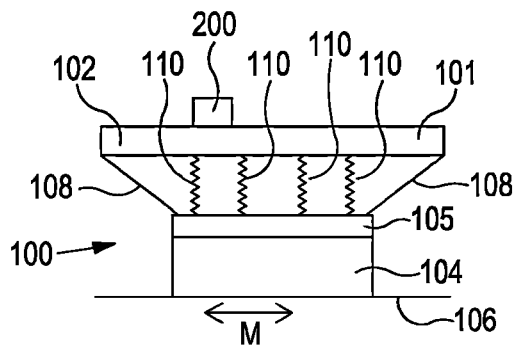
FIG. 21 is a side view of a first modification to the biasing arrangement of the first actuator assembly.
Figure 22:
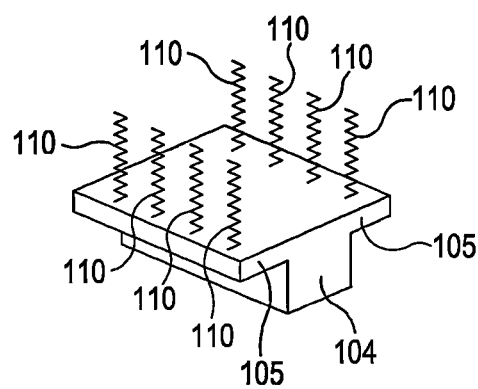
FIG. 22 is a perspective view of the first modification to the biasing arrangement.

FIGS. 21 and 22 show a first modification to the biasing arrangement in which plural springs 110 are used. In this example, the movable part 104 has wings 105 protruding laterally of the movement axis M and the plural springs 110 engage with each wing 105 at different positions along the movement axis M. As the moveable part 104 moves, at least one of the springs 110 applies a biasing force to the movable part 104, providing the same function as the single spring 110 in the above examples. This arrangement assists in preventing the moveable part 104 from lifting off the surface 106 of the static part 101 when the movable part 104 is in motion.

Figure 23:
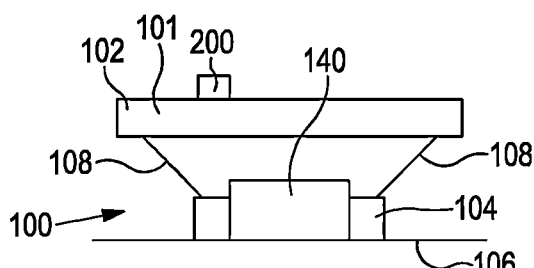
FIG. 23 is a side view of a second modification to the biasing arrangement of the first actuator assembly.
Figure 24:
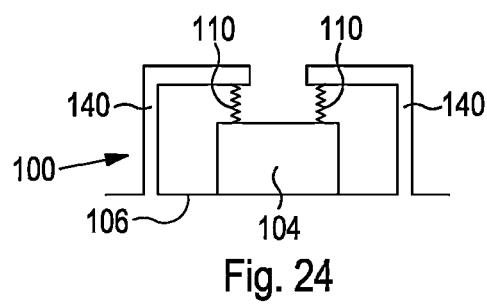
FIG. 24 is cross-sectional view of the second modification to the biasing arrangement.

FIGS. 23 and 24 show a second modification to the biasing arrangement in which two springs 110 are provided and are not connected to the body 101. Instead the static part 101 includes arms 150 that protrude from the surface 106 and overhang the movable part 104. The springs 110 are connected at one end to the arms 150 and at the other end to the movable part 104, to provide the same function as the single spring 110 in the above examples.

Figure 25:
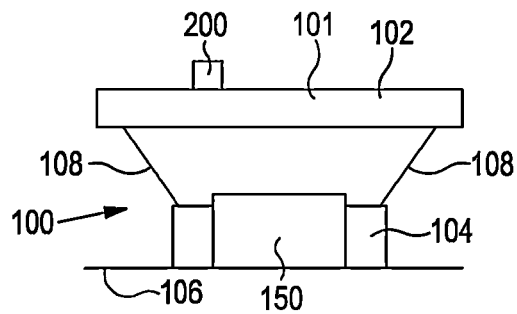
FIG. 25 is a side view of a third modification to the biasing arrangement of the first actuator assembly.
Figure 26:
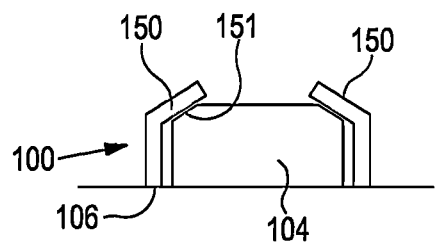
FIG. 26 is cross-sectional view of the third modification to the biasing arrangement.

FIGS. 25 and 26 show a third modification to the biasing arrangement in which the spring 110 is replaced by a pair of flexures 150 that each protrude from the surface 106 and engage the upper surface 151 of the movable part 151. The flexures 150, due to their resilience, bias the movable part 104 into contact with the surface 106, and therefore act as resilient biasing elements providing the same function as the single spring 110 in the above examples.

Figure 27:
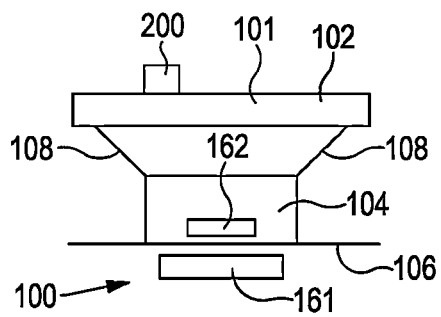
FIG. 27 is a side view of a fourth modification to the biasing arrangement of the first actuator assembly.

In general, the spring 110 may be replaced by a type of biasing arrangement that applies biasing by means other than a resilient element, for example a magnetic biasing arrangement. FIG. 27 illustrates a fourth modification to the biasing arrangement in which the spring 110 is replaced by a magnetic biasing arrangement 160 formed by a static magnet 161 and a movable magnet 162. The static magnet 161 is provided in the static part 101 below the surface 106. The movable magnet 162 is provided in the movable part 104. The static magnet 161 and the movable magnet 162 are attracted together magnetically to bias the movable part 104 into contact with the surface 106, and thereby provide the same function as the spring 110, as described above.

In the embodiments described above the static part 101 includes a single surface 106 which is larger than the movable part 104 and which contacts a single, facing surface of the movable part 104. However, that is not essential. In other embodiments, the static part 101 may plural bearing surfaces corresponding to surface 106 which contact the movable part 104. Similarly, the movable part 104 may include plural bearing elements which each comprise a facing surface that contacts the surface 106, or the plural bearing surfaces, if present.

Figure 28:
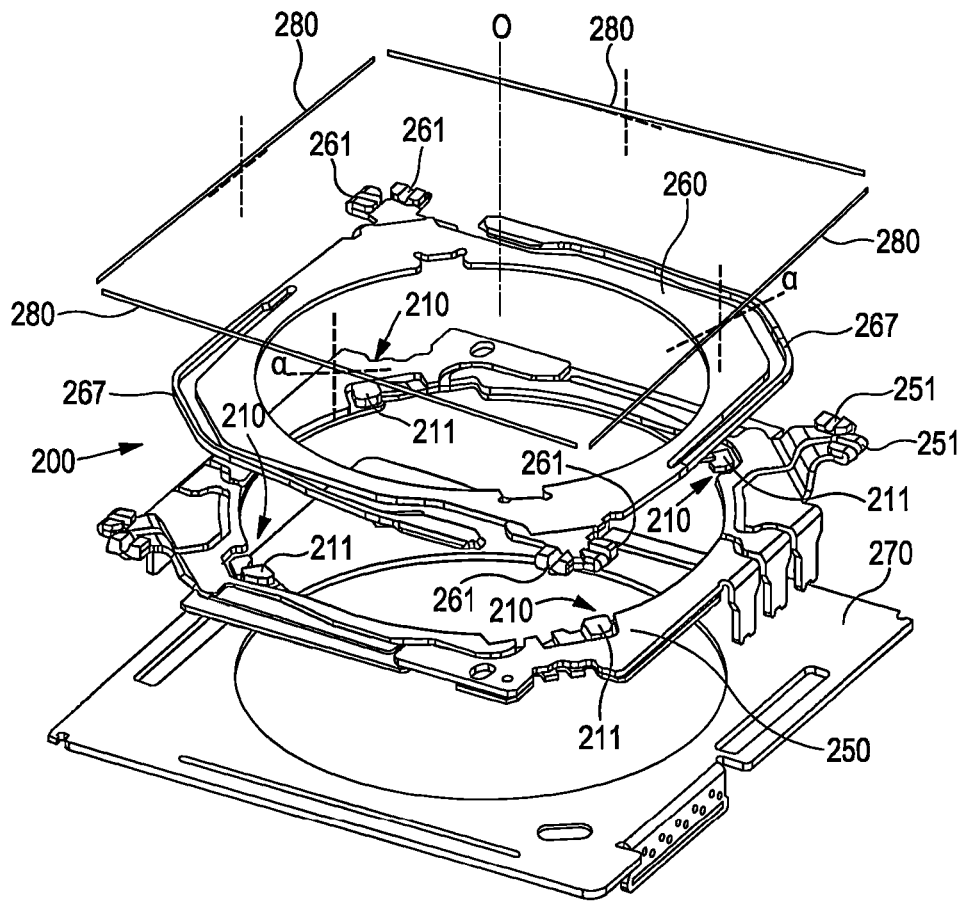
FIG. 28 is an exploded view of a second actuator assembly for providing optical image stabilisation in an optical apparatus.
Figure 29:
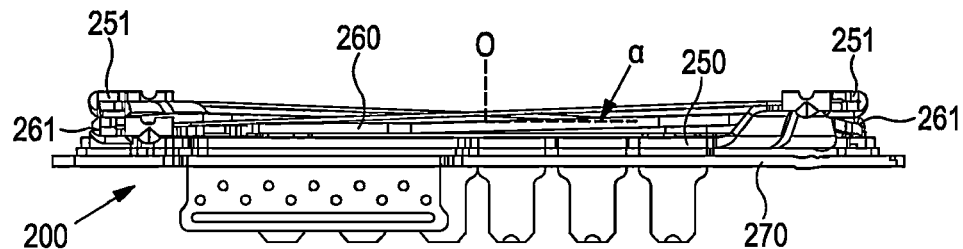
FIG. 29 is a side view of the second actuator assembly.
Figure 30:
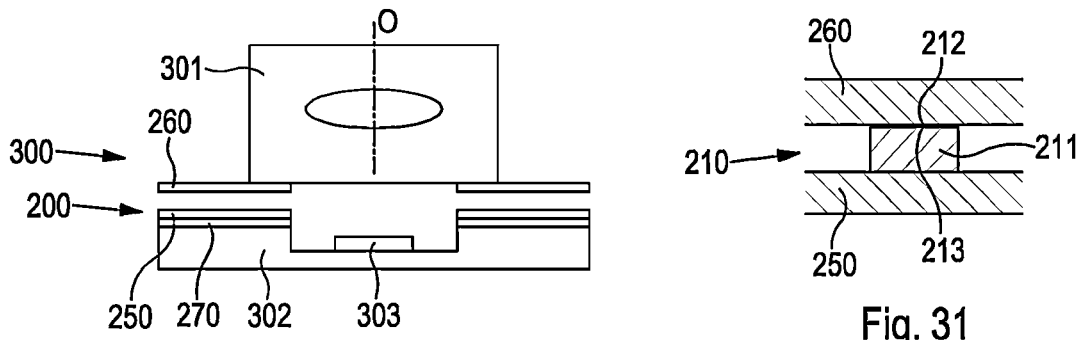
FIG. 30 is a schematic cross-sectional view of a camera apparatus incorporating the second actuator assembly.

By way of example, FIGS. 28 and 29 show a second actuator assembly 200 that is suitable for providing optical image stabilisation (OIS) when incorporated in a camera apparatus 300 as shown in FIG. 30, or other optical apparatus. The second actuator assembly 200 is arranged as described below, but in general terms has a similar arrangement and function to the actuator arrangement described in WO-2017/755788, except for some differences described below. Accordingly, reference is made to WO-2017/755788.

The second actuator assembly 200 includes a movable plate 260 and a support plate 250 which are the first part and the second part, respectively, in this example. The movable plate 260 is movable with respect to the support plate 260 and the term "movable" is used for clarity of description because the support plate 250 is often held stationary by a user in normal use, but the movement is relative so if the movable plate 260 were held stationary then the support plate 250 would move.

The support plate 250 and the movable plate 260 are integral sheets made of metal, for example steel such as stainless steel. The support plate 250 is fixed to a support sheet 270.

The second actuator assembly 200 may be incorporated in an optical apparatus such as a camera apparatus 300 as shown in FIG. 30 and as will now be described. The movable plate 260 supports a lens assembly 301. The support sheet 270 is fixed to a base 302 on which an image sensor 303 is mounted, although in other types of optical apparatus the image sensor 303 may be omitted. Each of the support plate 250 and the movable plate 260 is provided with a central aperture aligned with an optical axis O allowing the passage of light from the lens assembly 301 to the image sensor 303 to allow the image sensor 303 to capture an image formed by the lens assembly 301.

Figure 31:
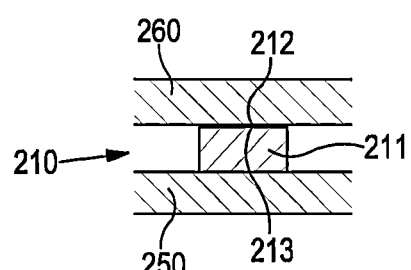
FIG. 31 is cross sectional view of a plain bearing of the second actuator assembly.

The second actuator assembly 200 includes four plain bearings 210 spaced around the optical axis O and each having a structure shown in more detail in FIG. 31. Each plain bearing 210 comprises a bearing element 211 mounted on the support plate 250, for example by adhesive, and a bearing surface 212 which is a surface of the movable plate 260 (shown in FIG. 31 and on the underside of the movable plate 260 as viewed in FIG. 28). The bearing element 211 bears on the bearing surface 212. In particular, an outer surface 213 of the bearing element 211 contacts the bearing surface 212, the outer surface 213 of the bearing element 211 and the bearing surface 212 conforming with each other. The plain bearings 210 may be arranged as described in further detail in WO-2017/755788.

Thus, the movable plate 260 is capable of movement relative to the static plate 260 across the bearing surfaces 212 of the plain bearings 210 in any direction in two dimensions orthogonal to the optical axis O.

As an alternative, the plain bearings 210 may be reversed to comprise a bearing element mounted on the movable plate 260 and a bearing surface which is a surface of the support plate 250. In that case, the support plate 250 would form the first part and the movable plate 260 would form the second part. In that sense, the lens assembly 301 may be mounted on either one of the first and second parts.

The second actuator assembly 200 includes comprises two flexures 267 connected between the support plate 250 and the movable plate 260. In this example, the flexures 267 are formed integrally with the movable plate 260 at one end thereof and are mounted to the support plate 250 at the other end thereof, although the flexures 267 could be formed integrally with the support plate 250 and mounted to the movable plate 260, or else could be separate elements mounted to each of the support plate 250 and the movable plate 260.

The flexures 267 are resilient and are therefore resilient biasing elements. The flexures 267 are arranged to act as a resilient biasing arrangement biasing the support plate 250 into contact with bearing surfaces 212 of the movable plate 260. This may be achieved by configuring the flexures 267 so that they are deflected from their relaxed state to provide a pre-loading force that provides the biasing. This generates a reaction between the movable plate 260 and the bearing surfaces 212, as well as generating frictional forces between the movable plate 260 and the bearing surfaces 212.

Simultaneously, the flexures 267 permit movement of the movable plate 260 relative to the support plate 250 orthogonal to the optical axis O.

The flexures 267 are made of a suitable material that provides the desired mechanical properties and is electrically conductive so that the flexures 267 may electrically connect SMA actuator wires 280 that are connected thereto, for carrying the drive current supplied to the SMA actuator wires 280. Typically the material is a metal having a relatively high yield, for example steel such as stainless steel.

The second actuator assembly 200 also includes four SMA actuator wires 280 connected between the support plate 250 and the movable plate 260. Specifically, the support plate 250 is formed with crimps 251 and the movable plate 260 is formed with crimps 261, wherein the crimps 251 and 261 crimp the four SMA actuator wires 280 so as to connect them to the support plate 250 and the moving plate 260. In contrast to arrangement disclosed in WO-2017/755788 of the SMA actuator wires 280 extending perpendicular to the optical axis O, each SMA actuator wire 280 is inclined at an acute angle α of greater than 0° with respect to the bearing surfaces 212 so as to apply a force ("upforce"), on contraction of the SMA actuator wire 280, with a component normal to the bearing surfaces 212 that biases the support plate 250 away from the bearing surfaces 212 and with a component parallel to the bearing surfaces 212.

The SMA actuator wires 280 have an arrangement around the optical axis O which is the same as that described in WO-2017/755788 so that each SMA actuator wires 80 applies a component of force parallel to the bearing surfaces 212 in different directions and the SMA actuator wires 280 are capable of driving movement of the movable plate 260 relative to the support plate 250 in two dimensions across the bearing surfaces 212.

As the SMA actuator wires 280 are opposed, their average tension and hence the upforce can be controlled at least substantially independently of the movement.

The SMA actuator wires 280 are each connected to a control circuit which may be implemented in an integrated circuit chip. The control circuit in use applies drive signals to the SMA actuator wires 280 which resistively heat the SMA actuator wires 280 causing them to contract. In operation, the SMA actuator wires 280 are selectively driven to move the movable plate 260 relative to the support plate 250 along a movement axis in any direction orthogonal to the optical axis O. Such control may be used to move the lens assembly relative to image sensor orthogonally to the optical axis O so as to provide OIS as described in WO-2017/755788.

In the absence of drive signals being applied, the SMA actuator wires 280 do not contract, and so the flexures 267 bias the movable plate 260 onto the bearing surfaces 212 generating frictional forces that are sufficient to retain the movable plate 260 in position on the bearing surfaces 212. In this state, the movable plate 260 is retained in position with zero power consumption by the second actuator assembly 200.

The flexures 267 may be designed to provide sufficient frictional forces to reduce motion and thereby improve stability of the second actuator assembly 200 and/or reduce the risk of audible noise when the SMA actuator wires 280 are in an unpowered state. This is important as being able to turn off OIS in situations where it is not effective (e.g. very high light levels) will reduce power consumption. In such a state, the frictional forces should retain the movable plate 260 in position on the bearing surfaces 212 in the event of typical forces acting on the second actuator assembly 200, including gravitational forces which can lead to movement that is dependent on the orientation (posture dependence) and inertial impact forces. Otherwise, there is a risk that the second actuator assembly 200 is insufficiently stable and/or that audible noise is generated (e.g. between the movable plate 260 and the bearing surfaces 212 or between the lens assembly 301 and an enclosure of the camera apparatus 300) when the second actuator assembly 200 vibrates, for example due to a haptic effect of a device such as a mobile telephone in which the second actuator assembly 200 is incorporated. When the second actuator assembly 200 is unpowered the SMA actuator wires 280 will slacken off and not exert much force. The position of the lens assembly 301 will therefore be determined by the interaction of the following forces:

the combined weight of the lens assembly 301 and the movable plate 260;
the stiffness of the flexures 267 (in the movement plane);
the frictional forces; and
inertia (when accelerating)

For example, when the camera apparatus 300 is held with the optical axis O horizontal the lens position will "sag" until the restoring force of the flexures 267 and frictional forces counterbalance the weight.

Generally, the frictional forces and hence the strength of the biasing force from the flexures 267 need to be increased with increasing mass of the cameral lens assembly that is to be mounted on the movable plate 260.

Additionally, when the camera is accelerated hard inertia may move the lens assembly 301 relative the image sensor 303. Both effects are undesirable, leading to blur from the motion and potential interference with OIS. A rigid stable system is desired for optimal OIS performance. The frictional forces generated between the movable plate 260 and the bearing surfaces 212 in the absence of contraction of the SMA actuator wires 280 may be less than the combined weight of the lens assembly 301 and the movable plate 260. In that case, the movable plate 260 is maintained in position on the bearing surfaces 212 under the effect of gravitational forces when the camera apparatus 300 is held with the optical axis horizontal and ignoring the other forces in the system.

If frictional forces of a suitable level to achieve these effects were encountered when the SMA actuator wires 280 were driven, then this may hinder OIS performance. However, due to the inclination of the SMA actuator wires 280, the force applied by the SMA actuator wires 280 on the support plate 250 has a component normal to the bearing surfaces 212 that biases the support plate 250 away from the bearing surfaces 212, thereby reducing the frictional forces therebetween so as to reduce the impact on OIS performance.

In order to provide an appropriate degree of reduction, the ratio between (i) the frictional forces generated when the SMA actuator wires 280 drive the maximum degree of relative movement of the movable part 260, and (ii) the frictional forces generated in the absence of contraction of the SMA actuator wires 280 may be less than 0.9 and more preferably less than 0.7. The inventors have found that this can be achieved with practical sets of design parameters, which includes, amongst other things, an angle α of greater than 0.5°. In smaller actuators, angles of 0.5° or less are generally associated with unpractically small height differences between the ends of the SMA actuator wires 280 whereas, in larger actuators, such small angles generally do not provide sufficient upforce. Larger angles may be used but generally lead to taller actuators.

An alternative approach of increasing the stiffness of the flexures 267 (in the movement plane) would reduce sag as the restoring force will be greater, but is undesirable as the stiffness interferes with the performance of the SMA actuator wires 280, for example by reducing stroke and slew rate.

An alternative approach of increasing the coefficient of friction of the plain bearings 210, e.g. by surface roughness, is undesirable because it can lead to instabilities in OIS and reduce performance.

In principle, the problems would be lessened by reducing lens mass, but relatively heavy lens assemblies are preferred for improvement of camera performance generally.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A shape memory alloy actuator assembly comprising:
a first part, including a surface;
a second part arranged to move relative to the first part across the surface;
a biasing arrangement arranged to bias the second part into contact with the surface so as to generate frictional forces therebetween for retaining the second part in position on the surface; and
at least one shape memory alloy actuator wire connected between the first part and the second part and arranged to, on contraction thereof, apply a force to the second part with a component parallel to the surface so as to drive movement of the second part relative to the first part across the surface, wherein said at least one shape memory alloy actuator wire comprises at least two opposed shape memory alloy actuator wires arranged to, on contraction thereof, apply forces to the second part with respective components parallel to the surface in opposite directions.

2. The shape memory alloy actuator assembly according to claim 1, further comprising a bearing arrangement arranged to guide movement of the second part relative to the first part along a movement axis across the surface.

3. The shape memory alloy actuator assembly according to claim 2, wherein the bearing arrangement comprises at least one rolling or sliding bearing.

4. The shape memory alloy actuator assembly according to claim 2, wherein the shape memory alloy wires are arranged to load the bearing arrangement.

5. The shape memory alloy actuator assembly according to claim 1, wherein the second part is arranged to move relative to the first part in two dimensions across the surface.

6. The shape memory alloy actuator assembly according to claim 5, wherein said at least one shape memory alloy actuator wire comprises at least three shape memory alloy actuator wires.

7. The shape memory alloy actuator assembly according to claim 1, wherein the biasing arrangement comprises at least one resilient biasing element.

8. The shape memory alloy actuator assembly according to claim 7, wherein the at least one resilient biasing element comprises at least one spring or flexure.

9. The shape memory alloy actuator assembly according to claim 1, wherein the biasing arrangement comprises a magnetic biasing arrangement.

10. The shape memory alloy actuator assembly according to claim 1, wherein the first part includes plural surfaces.

11. The shape memory alloy actuator assembly according to claim 1, wherein the second part includes plural bearing surfaces which the biasing arrangement is arranged to bias into contact with the surface, or plural surfaces, of the first part.

12. The shape memory alloy actuator assembly according to claim 1, wherein
the second part is arranged to move relative to the first part in two dimensions across the surface, and
said at least one shape memory alloy actuator wire comprises four shape memory alloy actuator wires arranged to, on contraction thereof, apply forces to the second part with respective components parallel to the surface in any direction in two dimensions across the surface.

13. An optical apparatus comprising:
a shape memory alloy actuator assembly according to claim 1; and
a lens assembly having an optical axis, the lens assembly being mounted one of the first and second parts, the at least one shape memory alloy actuator wire being arranged to drive movement of the lens assembly relative to the other one of the first and second parts orthogonal to the optical axis, wherein the frictional forces generated between the second part and the surface in the absence of contraction of the of the at least one shape memory alloy actuator wire is less than the combined weight of the lens assembly and said one of the first and second parts.

* * * * *